Patented Apr. 17, 1934

1,955,121

UNITED STATES PATENT OFFICE 1,955,121

MANUFACTURE OF HYDRAULIC CEMENT

Knud Folke and Henning Hansen, Copenhagen, Denmark, assignors to F. L. Smidth & Co., New York, N. Y., a corporation of New Jersey No Drawing. Application May 20, 1932, Serial No. 612,629. In Denmark June 3, 1931

10 Claims. (Cl. 106—25)

This invention is concerned particularly with the preparation of the cement raw material for burning. It is well understood that the quality of the finished product is dependent, among other things, on the homogeneity of the mixture of raw material prepared for burning. The raw material, usually a mixture of what may for convenience and brevity be termed lime and clay, must be comminuted as to its elements and mixed very intimately and so treated as to avoid separation of the mixture into its component parts before or during its passage through the kiln. Both the dry process and the wet process of cement manufacture have their respective advantages and disadvantages. The wet process gives a homogeneous, fine grained and constant mixture without any considerable loss of material, such as is incident to the dry process, but because of the relatively large water content of the raw material a considerably larger fuel consumption is necessary in the subsequent treatment. In the development of the present invention it has been found that the preparation of the raw material for burning can be accomplished with the use of a much smaller quantity of water than heretofore if the raw material or one or the other of its component elements is formed into a slurry or pasty mass with a liquid which is chemically inert as to the raw material and is repellant or otherwise of such a character that it is expelled from the slurry or pasty mass by the addition of water, leaving the raw material in a pasty condition ready for introduction into the kiln in the form of nodules or otherwise and containing a much smaller quantity of water than would otherwise be required to secure the desired homogeneity and other qualities of the raw material than would be required with the use of water alone.

In the practise of the invention the raw material, either as to each of its component elements or as to the mixture of the component elements, is comminuted to the desired degree of fineness and is, either as to one or the other or both of its component elements separately, or as to the mixture of the component elements, mixed with a suitable inert liquid. Obviously, either of the component elements or the mixture of the component elements can be comminuted either before the addition of the inert liquid or in the presence of the inert liquid. Such liquid should be not only chemically inert as to the raw material, but it should be of such a character as to be repellant with respect to water. It has been found that an organic liquid, such as crude oil, or its fluid distillation products, is well suited for the purpose, being insoluble in water and having a specific gravity different from that of water. It may be used in about equal proportions by weight with the dry material. When a mixture has been formed with the inert liquid, water is added in quantity determined by the conditions of operation, such as the natural water content of the raw material, the adaptability of the raw material for the formation of nodules or otherwise for introduction into the kiln, the character of the inert liquid, etc., the inert liquid or most of it being expelled by such addition of water. It has been found that when paraffine oil or petroleum is used as the inert, organic liquid, the total amount of water of 25% to 30% of the weight of the dry material treated or only about one half of that commonly used in the wet process, is suitable for the production of a pasty mass of such consistency that it can be introduced directly into the kiln without preliminary drying or with such limited drying as may be found desirable to eliminate the small quantity of inert liquid which may be found remaining in the mass. In fact, experience has shown that when water is added slowly to the mixture formed by the raw material and the inert liquid, with such stirring or agitation as may be necessary to disseminate the water throughout the mass, the mass assumes of itself the form of nodules, suitable for introduction into the kiln. Should such nodulization fail to take place of itself, the pasty mass can be extruded from a press and the resultant rope-like form be cut into nodules of suitable size. Such subjection to the action of a press serves also to remove the greater part of the small residue of inert liquid which has not been expelled by the action of the water.

It will be obvious that the invention can be practised in various ways. Thus, if the lime and the clay are comminuted and mixed together in the inert liquid and water added to such mixture, the component elements of the raw material may be crushed in a dry or nearly dry condition and then passed through a ball mill and eventually through a tubemill where the inert liquid is added in such quantity as to cover the grinding bodies; the mixture may then be conducted to a receptacle in which it is stirred constantly, water being added in the form of spray, with immediate formation of nodules; the inert liquid will at the same time be expelled from the raw material in a practically pure state so that it can be led away to be used again; the nodules thus formed may be subjected, if desired, to the action of a press as already stated; the nodules can then be delivered directly to the kiln for burning or if desired they can be subjected to the high temperature of the hot gases from the kiln or otherwise dried for the purpose of further evaporating the water content of the nodules and the residue of the inert liquid; by condensation of the vapors of the inert liquid thus set free in a suitable drying device, it is possible to recover practically all of the inert liquid.

In another procedure the clay, for example, can be comminuted in water in the amount required in the finished nodules and the component element, such as lime, can be comminuted in the presence of the organic liquid; the relatively thin slurries thus formed can then be mixed intimately with expulsion of the inert liquid from the mass by the action of the water and the simultaneous formation of the nodules.

Not only is it possible to effect a considerable saving of fuel, as compared with the wet process as ordinarily carried on, with retention of the good results of the wet process, but the length of a rotary kiln used for the burning can be reduced considerably because of the substantial reduction of the water content of the nodules by the practise of the invention.

It will be understood that various changes in details of operation can be made as well as in the inert liquid employed and in the order in which various steps are performed, to suit different conditions of use, and that the invention, except as pointed out in the accompanying claims, is not restricted as regards the materials employed or the specific relation of the steps of the process.

We claim as our invention:

1. The improvement in the process of preparing cement raw material for burning which consists in comminuting the raw material, mixing the material with a liquid inert as to the material and repellent by water, and adding water to the mixture and thereby expelling the inert liquid therefrom.

2. The improvement in the process of preparing cement raw material for burning which consists in comminuting the raw material, mixing the material with a liquid inert as to the material and repellant by water, adding water to the mixture and thereby expelling the inert liquid therefrom, and nodulizing the mass.

3. The improvement in the process of preparing cement raw material for burning which consists in comminuting the raw material, mixing the material with a liquid inert as to the material and repellant by water, adding water to the mixture and thereby expelling the inert liquid therefrom, giving the mass a rope-like form, and separating the rope-like mass to form nodules.

4. The improvement in the process of preparing cement raw material for burning which consists in comminuting the raw material, forming a mixture of the material with a liquid chemically inert as to the raw material, insoluble in water and having a specific gravity other than that of water, adding water to the mixture and thereby expelling the inert liquid.

5. The improvement in the process of preparing cement raw material for burning which consists in comminuting the raw material, forming a mixture of the material with an organic liquid chemically inert as to the raw material, insoluble in water and having a specific gravity other than that of water, adding water to the mixture and thereby expelling the inert liquid.

6. The improvement in the process of preparing cement raw material for burning which consists in comminuting the raw material, forming a mixture of the material with petroleum, and adding water to the mixture and thereby expelling the petroleum.

7. The improvement in the process of preparing cement raw material for burning which consists in comminuting the component elements of the raw material, mixing the component comminuted elements in a dry state, adding to the mixture a liquid inert to the component elements and repellant by water, and adding water to the mass and thereby expelling the inert liquid.

8. The improvement in the process of preparing cement raw material for burning which consists in comminuting separately the component elements of the raw material, forming a slurry of one of the comminuted component elements with a liquid inert to the raw material and repellant by water, forming a slurry of the other comminuted component element with water, and mixing the slurries to expel the inert liquid and to form a pasty mass.

9. The improvement in the process of preparing cement raw material for burning which consists in comminuting the raw material, mixing the material with a liquid inert as to the material and repellant by water, adding water to the mixture and thereby expelling the inert liquid therefrom, and evaporating from the mixture any excess of water content and any residue of the inert liquid.

10. The improvement in the process of preparing cement raw material for burning which consists in comminuting the raw material, mixing the material with a liquid inert as to the material and repellant by water, adding water to the mixture and thereby expelling the inert liquid therefrom, evaporating from the mixture any excess of water content and any residue of the inert liquid, and recovering by condensation the vapors developed by evaporation.

KNUD FOLKE.
HENNING HANSEN.